United States Patent
Byun et al.

(10) Patent No.: US 10,687,202 B2
(45) Date of Patent: Jun. 16, 2020

(54) METHOD AND DEVICE FOR CONFIGURING BEARER FOR TRANSMISSION OF USER DATA

(71) Applicant: LG ELECTRONICS INC., Seoul (KR)

(72) Inventors: Daewook Byun, Seoul (KR); Taehun Kim, Seoul (KR); Jian Xu, Seoul (KR); Jinsook Ryu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/083,001

(22) PCT Filed: Mar. 6, 2017

(86) PCT No.: PCT/KR2017/002385
§ 371 (c)(1),
(2) Date: Sep. 7, 2018

(87) PCT Pub. No.: WO2017/155259
PCT Pub. Date: Sep. 14, 2017

(65) Prior Publication Data
US 2019/0069160 A1 Feb. 28, 2019

Related U.S. Application Data

(60) Provisional application No. 62/305,542, filed on Mar. 9, 2016.

(51) Int. Cl.
*H04W 8/08* (2009.01)
*H04W 76/20* (2018.01)
(Continued)

(52) U.S. Cl.
CPC ............ *H04W 8/08* (2013.01); *H04W 28/02* (2013.01); *H04W 28/12* (2013.01); *H04W 76/20* (2018.02);
(Continued)

(58) Field of Classification Search
CPC ........ H04W 8/08; H04W 28/02; H04W 28/12
See application file for complete search history.

(56) References Cited

U.S. PATENT DOCUMENTS

| 2013/0208699 A1 | 8/2013 | Hakkinen et al. |
| 2013/0260740 A1* | 10/2013 | Rayavarapu .......... H04W 76/27 455/422.1 |

(Continued)

FOREIGN PATENT DOCUMENTS

KR  101582015  12/2015

OTHER PUBLICATIONS

3GPP TS 23.401 v13.50 (Dec. 2015), 3rd Generation Partnership Project; Technical Specification Group Services and System Aspects; General Packet Radio Service (GPRS) enhancements for Evolved Universal Terrestrial Radio Access Network (E-UTRAN) access (Release 13) (Year: 2015).*

(Continued)

*Primary Examiner* — Gary Mui
(74) *Attorney, Agent, or Firm* — Dentons US LLP

(57) ABSTRACT

Provided are a method, for configuring a bearer for transmission of user data in user plane-based cellular Internet of Things (CIoT) by a base station in a wireless communication system, and a device for supporting same. The base station can: receive a tracking area update (TAU) request message from a terminal; transmit to a mobility management entity (MME) a UE context resume request message comprising the TAU request message; receive from the MME a UE context resume failure message comprising a cause value;

(Continued)

and determine whether or not a temporarily stopped UE context is to be remained on the basis of the cause value.

7 Claims, 11 Drawing Sheets

(51) Int. Cl.
    *H04W 28/02*     (2009.01)
    *H04W 76/30*     (2018.01)
    *H04W 76/27*     (2018.01)
    *H04W 28/12*     (2009.01)
    *H04W 88/08*     (2009.01)
    *H04W 4/70*     (2018.01)

(52) U.S. Cl.
    CPC ........... *H04W 76/27* (2018.02); *H04W 76/30* (2018.02); *H04W 4/70* (2018.02); *H04W 88/08* (2013.01)

(56) References Cited

U.S. PATENT DOCUMENTS

| | | | |
|---|---|---|---|
| 2015/0043403 A1* | 2/2015 | Martinez Tarradell | H04W 4/70 370/311 |
| 2016/0039287 A1* | 2/2016 | Masuda | G02B 27/0101 345/7 |
| 2017/0202050 A1* | 7/2017 | Deng | H04W 76/18 |
| 2018/0035420 A1* | 2/2018 | Centonza | H04W 72/048 |
| 2018/0110092 A1* | 4/2018 | Liu | H04W 76/19 |
| 2018/0324652 A1* | 11/2018 | Ryu | H04W 8/04 |
| 2018/0332462 A1* | 11/2018 | Kim | H04W 8/02 |
| 2018/0332650 A1* | 11/2018 | Kawasaki | H04W 8/22 |
| 2018/0343698 A1* | 11/2018 | Mitsui | H04W 76/20 |
| 2018/0352424 A1* | 12/2018 | Byun | H04W 76/30 |
| 2018/0352593 A1* | 12/2018 | Velev | H04W 76/12 |
| 2019/0021023 A1* | 1/2019 | Byun | H04W 4/70 |
| 2019/0021134 A1* | 1/2019 | Zhang | H04W 76/27 |
| 2019/0028860 A1* | 1/2019 | Futaki | H04W 48/18 |
| 2019/0028866 A1* | 1/2019 | Baek | H04W 4/50 |
| 2019/0028933 A1* | 1/2019 | Kawasaki | H04W 40/248 |
| 2019/0029066 A1* | 1/2019 | Xu | H04W 76/19 |
| 2019/0037629 A1* | 1/2019 | Ryu | H04W 76/19 |
| 2019/0045349 A1* | 2/2019 | Kim | H04W 8/02 |
| 2019/0045482 A1* | 2/2019 | Lee | H04W 76/28 |
| 2019/0045572 A1* | 2/2019 | Kim | H04W 76/19 |

OTHER PUBLICATIONS

3GPP TS 36.413 v13.1.0 (Dec. 2015), 3rd Generation Partnership Project; Technical Specification Group Radio Access Network; Evolved Universal Terrestrial Radio Access Network (E-UTRAN); S1 Application Protocol (S1AP)(Release 13) (Year: 2015).*
Ericsson, Alcatel-Lucent, Sony; "introduction of solution 18-suspend and resume procedure", S2-154453, 3GPP TSG-SA WG2 #112, Anaheim, USA, Nov. 16-20, 2015 (Year: 2015).*
Alcatel-lucent, Vodafone, Qualcomm; Nokia Networks, "Introduction of attach procedure changes for CIoT EPS optimization", S2-160448, 3GPP TSG SA WG2 Meeting #113 St. Kitts, Jan. 25-29, 2016 (Year: 2016).*
Samsung, "The user plane CIOT optimization", R3-160029, 3GPP TSG RAN WG3 #Ad Hoc, Budapest, Hungary, Jan. 20-22, 2016 (Year: 2016).*
Samsung, "The resume of the UE bearer", R3-160030, 3GPP TSG RAN WG3 #Ad Hoc, Budapest, Hungary, Jan. 20-22, 2016 (Year: 2016).*
Huawei, "Introduction of User Plane solution for NB-IoT", R3-160114 3GPP TSG RAN WG3 AdHoc NB-IoT, Budapest, Hungary, Jan 20-22, 2016 (Year: 2016).*
Samsung, "The user plane CIOT optimization", R3-160124, 3GPP TSG RAN WG3 #Ad Hoc, Budapest, Hungary, Jan. 20-22, 2016 (Year: 2016).*
Huawei, "Summary of email discussion: [NBAH#04][NBIOT/Resume] RRC Functions for suspend-resume", 3GPP TSG-RAN WG2 Meeting #93, Feb. 15-19, 2016, R2-161166.
Samsung, "Introduction of the user plane CIOT optimization", Change Request, 3GPP TSG-RAN WG3 Meeting #Ad Hoc, Jan. 20-22, 2016, R3-160077.
Ericsson, "Bearer Admission at UE Context Resume," R3-160352, 3GPP TSG RAN WG3 Meeting #91, St. Julian's, Malta, Feb. 6, 2016, see section 2.
Ericsson et al., "Introduction of the UE Context Resume Function," R3-160549, 3GPP TSG RAN WG3 Meeting #91, St. Julian's, Malta, Feb. 19, 2016, see seciton 8.3.x2.
LG Electronics Inc., "Further Discussion on Resume Procedure for Solution 18, "R3-160757, 3GPP TSG RAN WG3 Meeting #91bis, Bangalore, India, Apr. 2, 2016, see sections 2.1, 2.2.

* cited by examiner

METHOD AND DEVICE FOR CONFIGURING BEARER FOR TRANSMISSION OF USER DATA

CROSS-REFERENCE TO RELATED APPLICATIONS

This application is the National Stage filing under 35 U.S.C. 371 of International Application No. PCT/KR2017/002385, filed on Mar. 6, 2017, which claims the benefit of U.S. Provisional Application No. 62/305,542 filed on Mar. 9, 2016, the contents of which are all hereby incorporated by reference herein in their entirety.

BACKGROUND OF THE INVENTION

Field of the Invention

The present invention relates to a wireless communication system and, more particularly, to a method for a base station to configure a bearer for the transport of user data in a user plane based cellular Internet of Things (CIoT) in a wireless communication system and an apparatus supporting the same.

Related Art

3 In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

Internet of Things (IoT) is a future infrastructure and service of information communication for the future, in which all things are connected to the Internet to directly communicate with each other. Although the IoT is necessary to improve quality of life and productivity on the basis of a super-connected society, the IoT is important ultimately because it forms an infrastructure of a nation, and further, a central nervous system for humanity and the Earth. The IoT is in an initial stage not having a significant profit model yet. However, a market scale of the IoT as a new paradigm of the 21st century is more than 10 times the existing cellular communication market, and is expected to grow rapidly. The IoT is roughly divided into cellular mobile communication based IoT (CIoT) and non-cellular based IoT.

SUMMARY OF THE INVENTION

In a user plane based CIoT, a UE may attempt resumption of a suspended RRC Connection by transmitting an RRC Connection Resume Request to an eNB. However, in a current user plane based CIoT, although the eNB receives a suspended RRC Connection resume request from the UE, if the MME determines that resumption of a suspended UE context is impossible, the eNB should release the suspended RRC connection. That is, even when the MME cannot resume a UE context, although there is a need to maintain the suspended RRC Connection for a predetermined time, the eNB should release the suspended RRC Connection. Accordingly, there is a need to suggest improved SI signaling for transmission of use data in the user plane based CIoT.

In an aspect, a method for configuring a bearer for transmission of user data in user plane based cellular Internet of Things (CIoT) by a base station in a wireless communication system is provided. The method includes receiving a tracking area update (TAU) request message from a UE; transmitting to a mobility management entity (MME) a UE context resume request message comprising the TAU request message; receiving from the MME a UE context resume failure message comprising a cause value; and determining whether or not to keep a suspended UE context based on the cause value.

The cause value may include information indicating whether the base station maintains the suspended UE context. When the cause value indicates that the base station maintains the suspended UE context, it may be determined that the suspended UE context is kept. When the cause value indicates that the base station does not maintain the suspended UE context, it may be determined that the suspended UE context is not kept.

The method may further include determining whether to provide an extended wait time to the UE based on the cause value. The cause value may include information indicating whether the base station maintains the suspended UE context and whether the base station provides the extended wait time to the UE.

The UE context resume failure message may further include a TAU reject message.

The method may further include receiving a downlink NAS transport message including a TAU reject message from the MME.

When it is determined by the MME that resumption of the suspended UE context is impossible, the UE context resume failure message may be received from the MME.

The UE may be in an RRC_IDLE state.

In another aspect, a base station for configuring a bearer for transmission of user data in user plane based cellular Internet of Things (CIoT) in a wireless communication system is provided. The base station includes: a memory; a transceiver; and a processor configured to connect the memory to the transceiver, the processor controls the transceiver to receive a tracking area update (TAU) request message from a UE, controls the transceiver to transmit a UE context resume request message comprising the TAU request message to a mobility management entity (MME), controls the transceiver to receive a UE context resume failure message comprising a cause value from the MME, and is configured to determine whether or not a suspended UE context is kept based on the cause value.

An eNB may maintain a suspended UE context.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
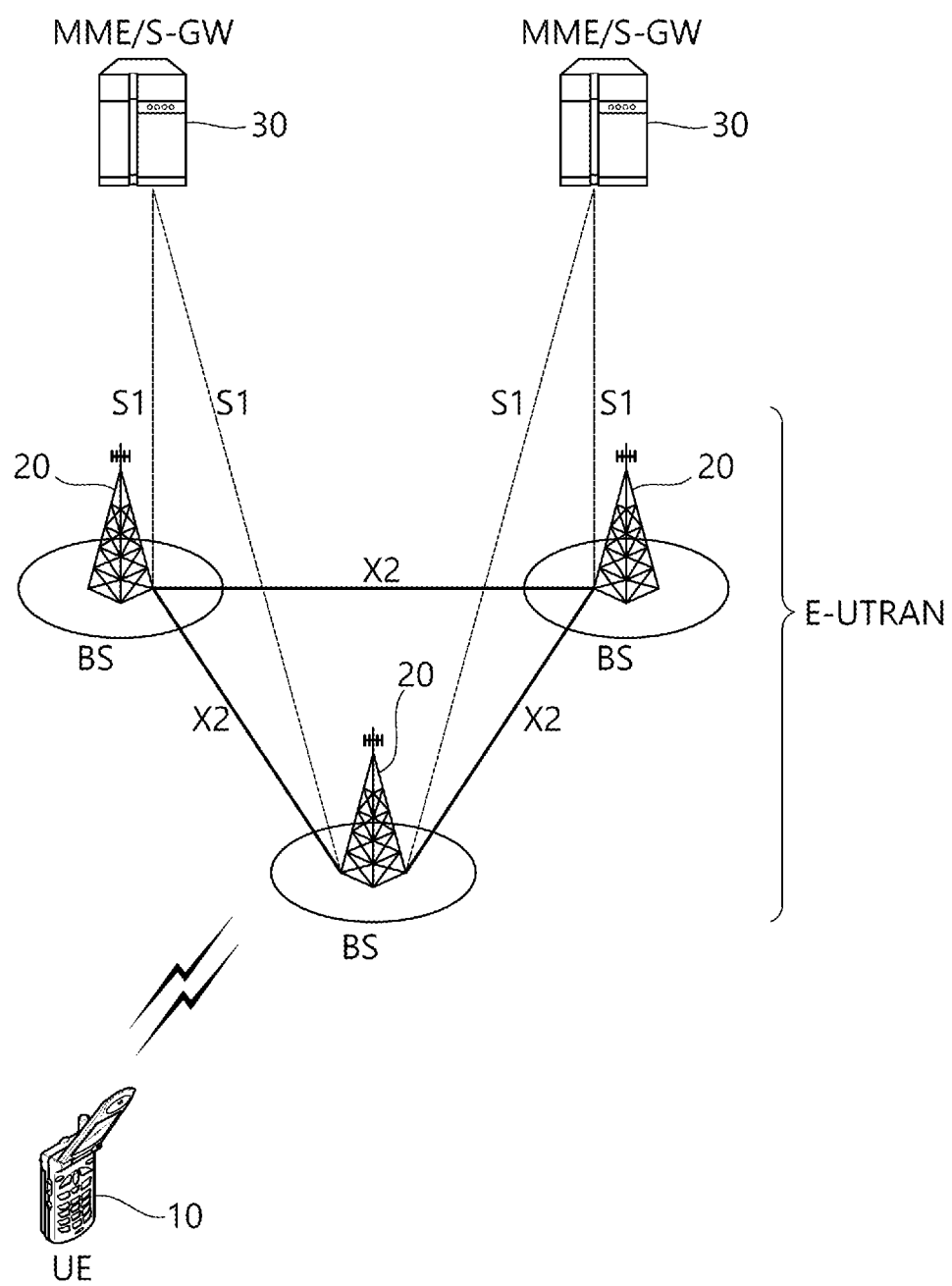
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein symply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, encryption of the user plane, SAE bearer control, and encryption and integrity protection of NAS signaling.

Figure 2:
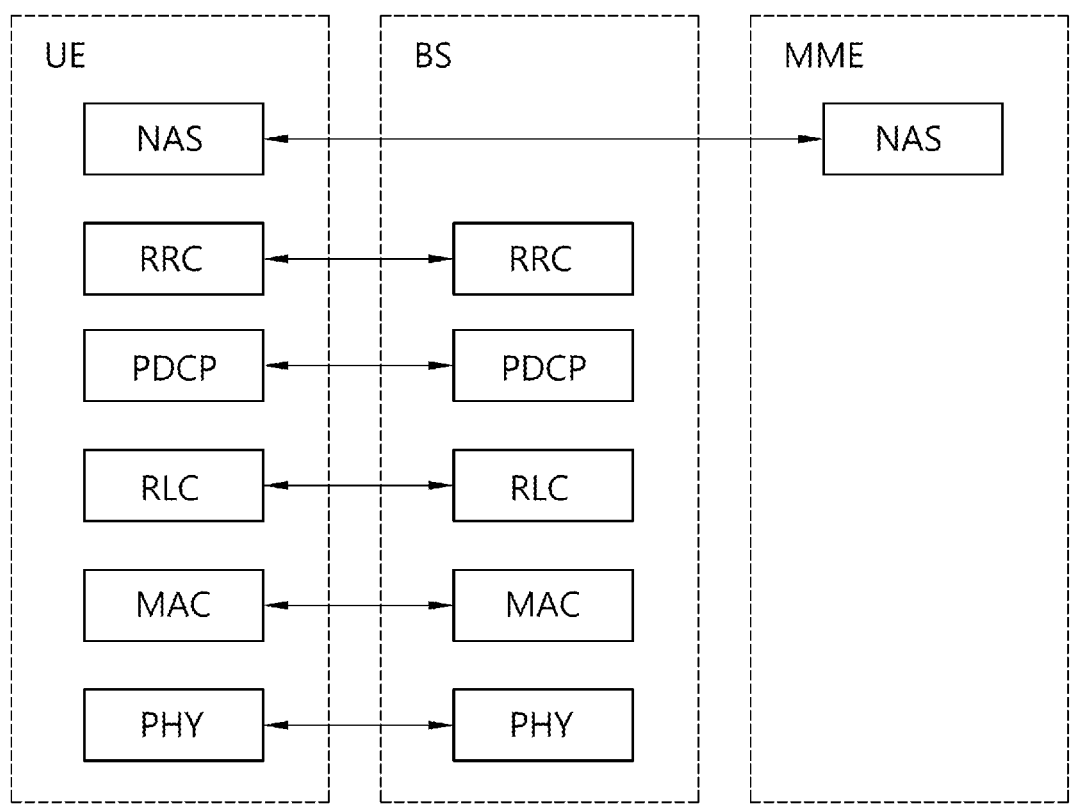
FIG. 2 shows a control plane of a radio interface protocol of an LTE system.
Figure 3:
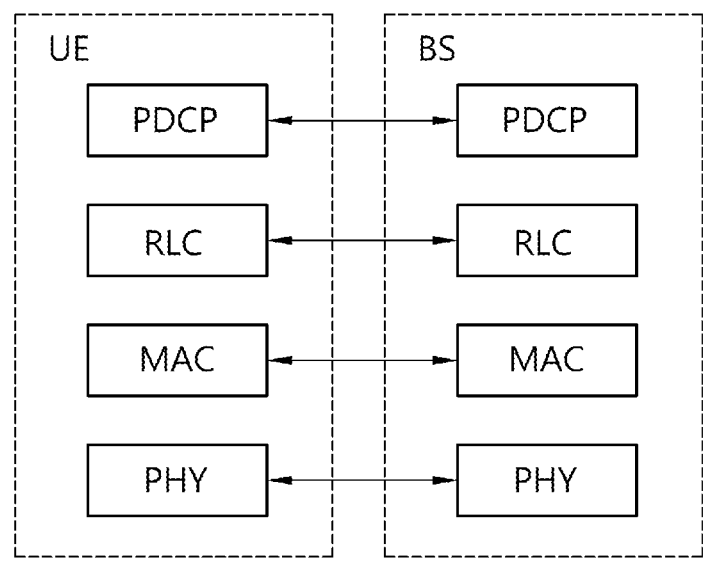
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes encryption which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and encryption.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, Machine-Type Communication (MTC) Will be Described.

Figure 4:
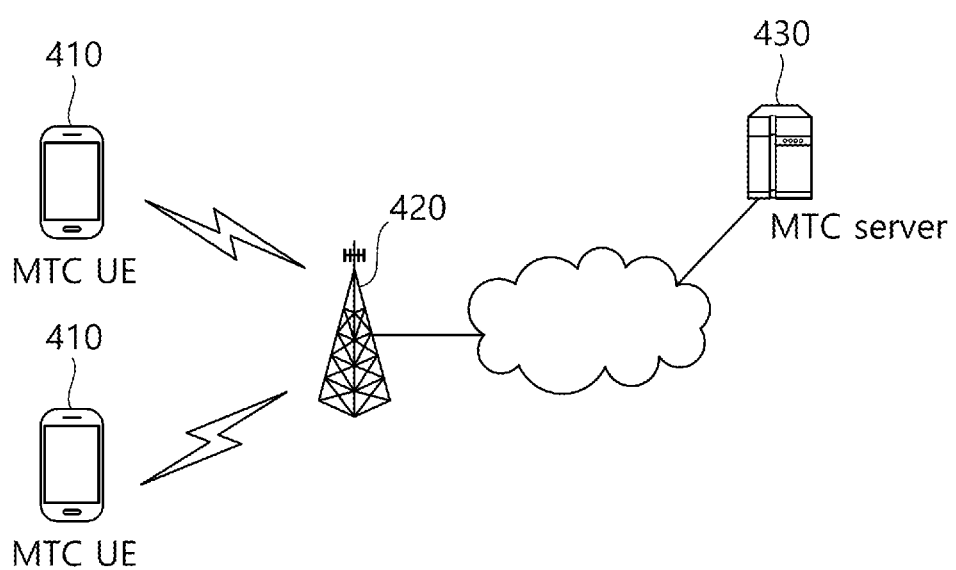
FIG. 4 shows an example of MTC.

FIG. 4 shows an example of MTC.

MTC refers to information exchange between MTC UEs 410 via a BS 420 without involving human interactions or information exchanges between an MTC UE 410 and an MTC server 430 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 430 is an entity communicating with the MTC UE 410. The MTC server 430 runs an MTC application and provides an MTC-specific service to an MTC device. The MTC UE 410 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 1 shows 3GPP UE categories.

TABLE 1

| UE Category | DL speed | UL speed |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Hereinafter, Cellular Internet of Things (CIoT) Will be Described.

Internet of Things (IoT) is a future infrastructure and service of information communication for the future, in which all things are connected to the Internet to directly communicate with each other. Although the IoT is necessary to improve quality of life and productivity on the basis of a super-connected society, the IoT is important ultimately because it forms an infrastructure of a nation, and further, a central nervous system for humanity and the Earth. The IoT may be roughly divided into cellular mobile communication based IoT (CIoT) and non-cellular based IoT.

The CIoT implies cellular mobile communication based IoT. To effectively support a cellular based IoT service, MTC traffic generated intermittently and sporadically in a form of a packet having a short length must be efficiently transferred. In addition, in case of an application service having a real-time constraint, it is necessary to satisfy a delay requirement by immediately transmitting a data packet (in a grant-free form) without having to undergo a separate channel allocation procedure. Further, for a large-scale random access for the IoT service, it is necessary to decrease a device cost and power consumption, increase a coverage, and improve random access capacity and efficiency of a procedure.

Generally, a main use case of CIoT is a device for transmitting and receiving a small data packet. Therefore, a requirement to be fulfilled by a system may be to transmit/receive the small data packet efficiently. For example, battery consumption of a UE must be low when the small data packet is transmitted and received. For example, an amount of signaling required in a network and over the air must be reduced when the small data packet is transmitted and received.

In the user plane based CIoT, an RRC Suspend procedure and an RRC Resume procedure have been newly proposed for user data transmission. If an eNB has no longer data to be transmitted to a UE after establishing an RRC connection with the UE, the eNB may suspend the RRC connection. The RRC connection may be suspended through an RRC Suspend procedure. If the eNB has data to be transmitted to the UE after suspending the RRC connection with the UE, the eNB may resume the RRC connection. The RRC connection may be resumed through an RRC Resume procedure. Furthermore, in the user plane based CIoT, a mobility management (MM) procedure may been newly proposed for a tracking area update (TAU).

Hereinafter, an RRC Suspend Procedure for the Transport of User Data in the User Plane Based CIoT is Described.

Figure 5:
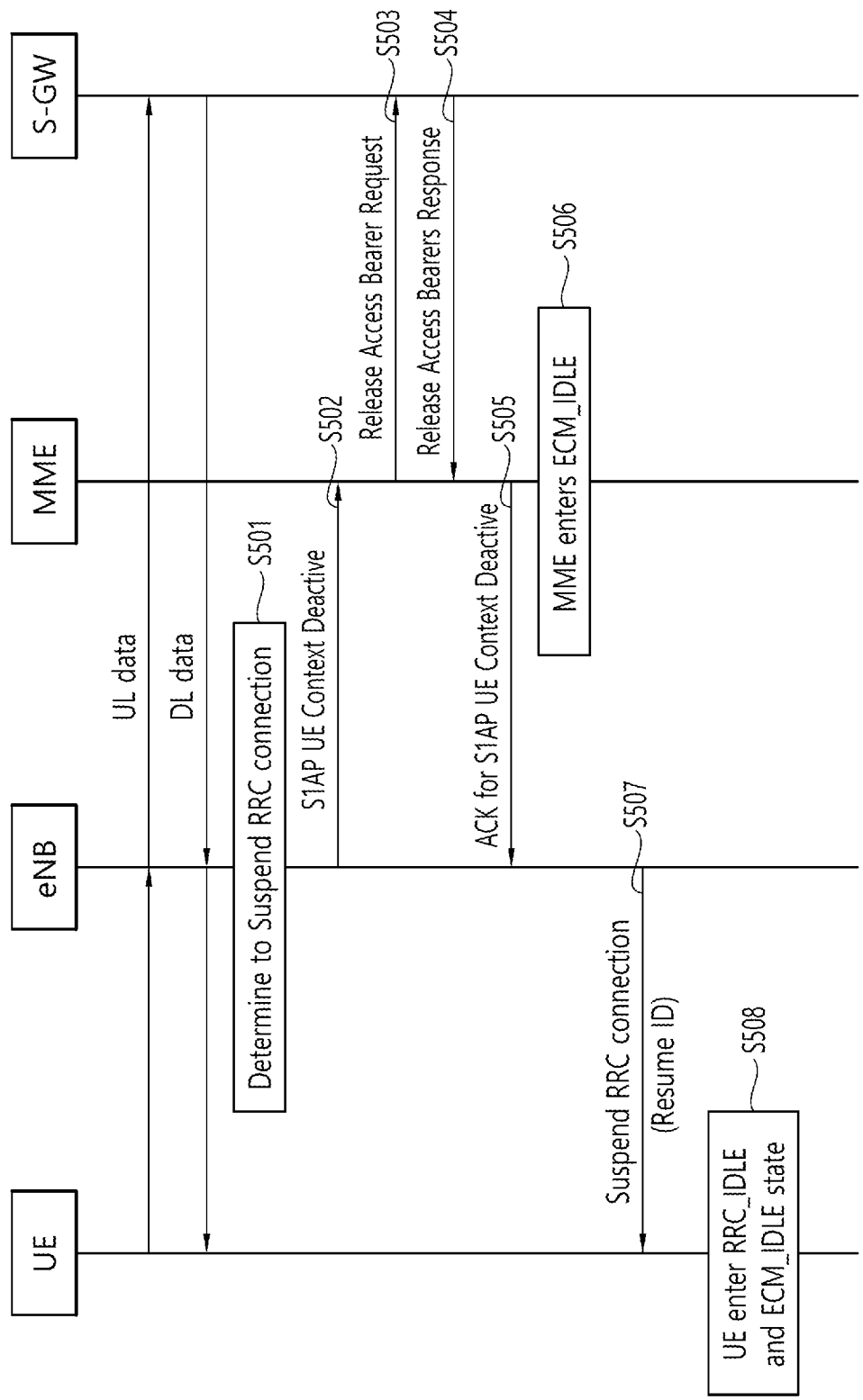
FIG. 5 shows the suspension procedure of an RRC connection in a user plane based CIoT.

FIG. 5 shows the suspension procedure of an RRC connection in a user plane based CIoT.

An RRC Suspend procedure may be used for transition from the RRC_CONNECTED state to the RRC_IDLE state. Furthermore, the RRC Suspend procedure may enable a UE to context in the RRC_IDLE mode.

Referring to FIG. 5, in step S501, a network may determine to suspend an RRC connection.

In step S502, an eNB may indicate an MME that the RRC connection of a UE has been suspended through a new S1AP message. The new S1AP message may be an S1AP UE Context Deactive message. The MME and the eNB may store UE context related to S1AP association.

In step S503, the MME may transmit a Release Access Bearers Request (abnormal release or "new cause" of a Radio Link Indication) message to an S-GW. The Release Access Bearers Request message may request the release of all of S1-U bearers for the UE. The S-GW may consider that the UE has become the IDLE state.

In step S504, the S-GW may transmit a response to the Release Access Bearers Request message to the MME.

In step S505, the MME may transmit ACK for the S1AP UE Context Deactive message to the eNB.

In step S506, the MME may enter the ECM_IDLE state.

In step S507, the eNB may suspend the RRC connection toward the UE. An identifier used after the suspended RRC connection is subsequently resumed may be provided. The identifier may be a "Resume ID."

In step S508, the UE RRC layer may enter the RRC_IDLE state, and a UE NAS layer may enter the ECM_IDLE state.

Hereinafter, an RRC Resume Procedure for the Transport of User Data in the User Plane Based CIoT is Described.

Figure 6:
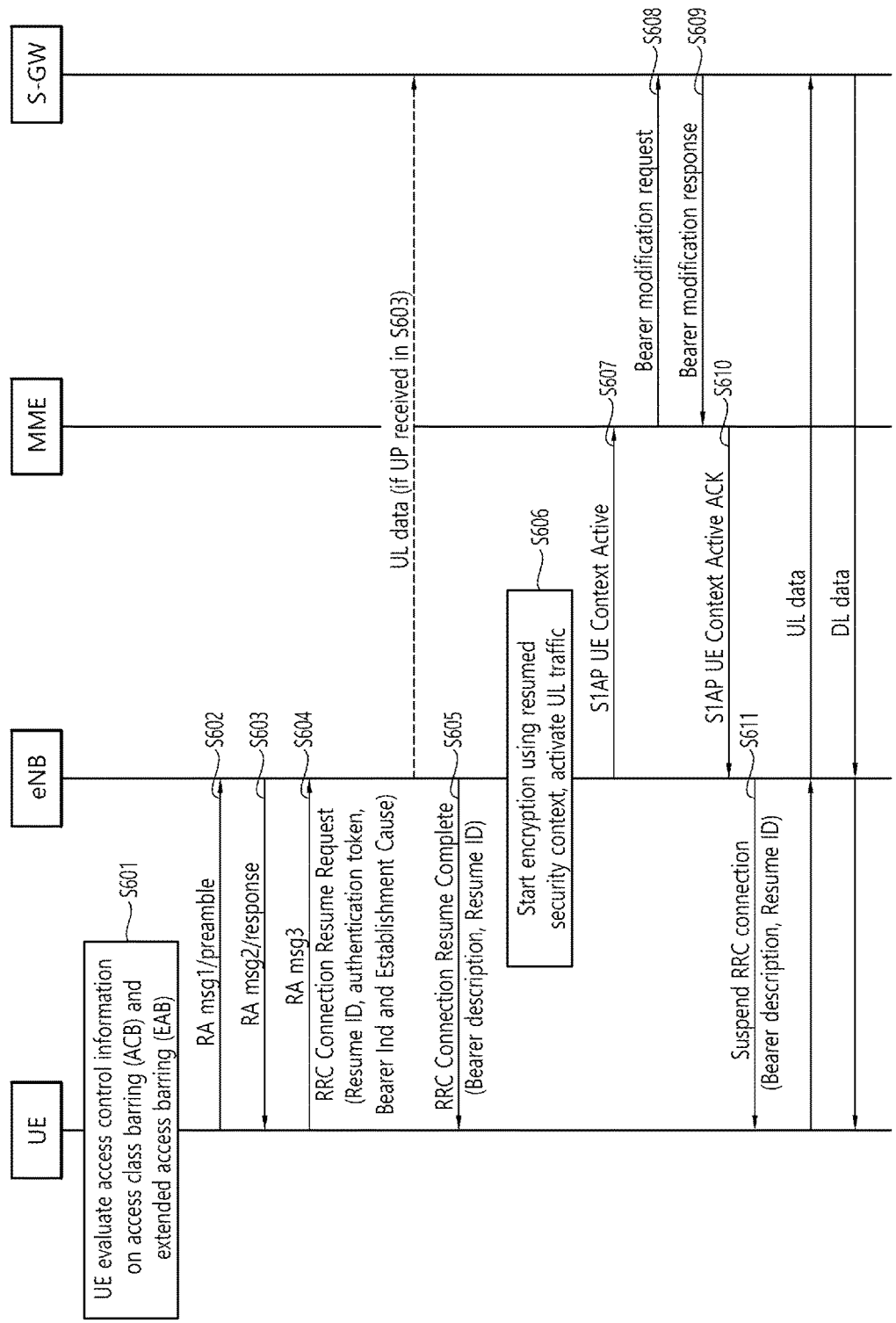
FIG. 6 shows the resume procedure of an RRC connection in the user plane based CIoT.

FIG. 6 shows the resume procedure of an RRC connection in the user plane based CIoT.

Referring to FIG. 6, in step S601 to S603, a UE complies with a legacy procedure, and a detailed description thereof is omitted.

In step S604, the UE may transmit msg3 to the eNB. The msg3 may be a new RRC Connection Resume Request message. The new RRC Connection Resume Request message may include the Resume ID, an authentication token, bearer indicator (Bearer Ind) and Establishment Cause of the UE. The eNB may use the Resume ID in order to associate the UE that has transmitted the Resume ID with previously stored UE context.

In step S605, the eNB may transmit an RRC Connection Resume Complete message to the UE. If the RRC Connection Resume Complete is designated, a network may indicate that which DRB has been resumed.

In step S606, the UE and the eNB may resume stored security context.

In step S607, the eNB may notify an MME of a UE state change. The UE state change may be notified through a new message. The new message may be an S1AP UE Context Active message. The MME may enter the ECM_CONNECTED state.

In step S608, the MME may transmit a Modify Bearer Request message to an S-GW for each PDN connection. If the S-GW supports a Modify Access Bearers Request procedure and it is not necessary for the S-GW to transmit signaling to a P-GW, the MME may transmit the Modify Access Bearers Request message to the S-GW for each UE in order to optimize signaling. Now, the S-GW can transmit downlink data toward the UE. The S-GW may consider that the UE has become the CONNECTED state.

In step S609, the S-GW may transmit a response to the Modify Bearer Request message to the MME. The response may be a Modify Bearer Response message.

In step S610, the MME may transmit ACK for the S1AP UE Context Active message to the eNB.

If the msg3 has included a user plane and an indication indicating that all of user planes are transmitted, in step S611, the eNB may suspend the RRC connection, and may implicitly indicate that a user plane has been successfully received instead of the transmission of a msg4.

Hereinafter, an MM procedure for a TAU in the user plane based CIoT is described.

Figure 7:
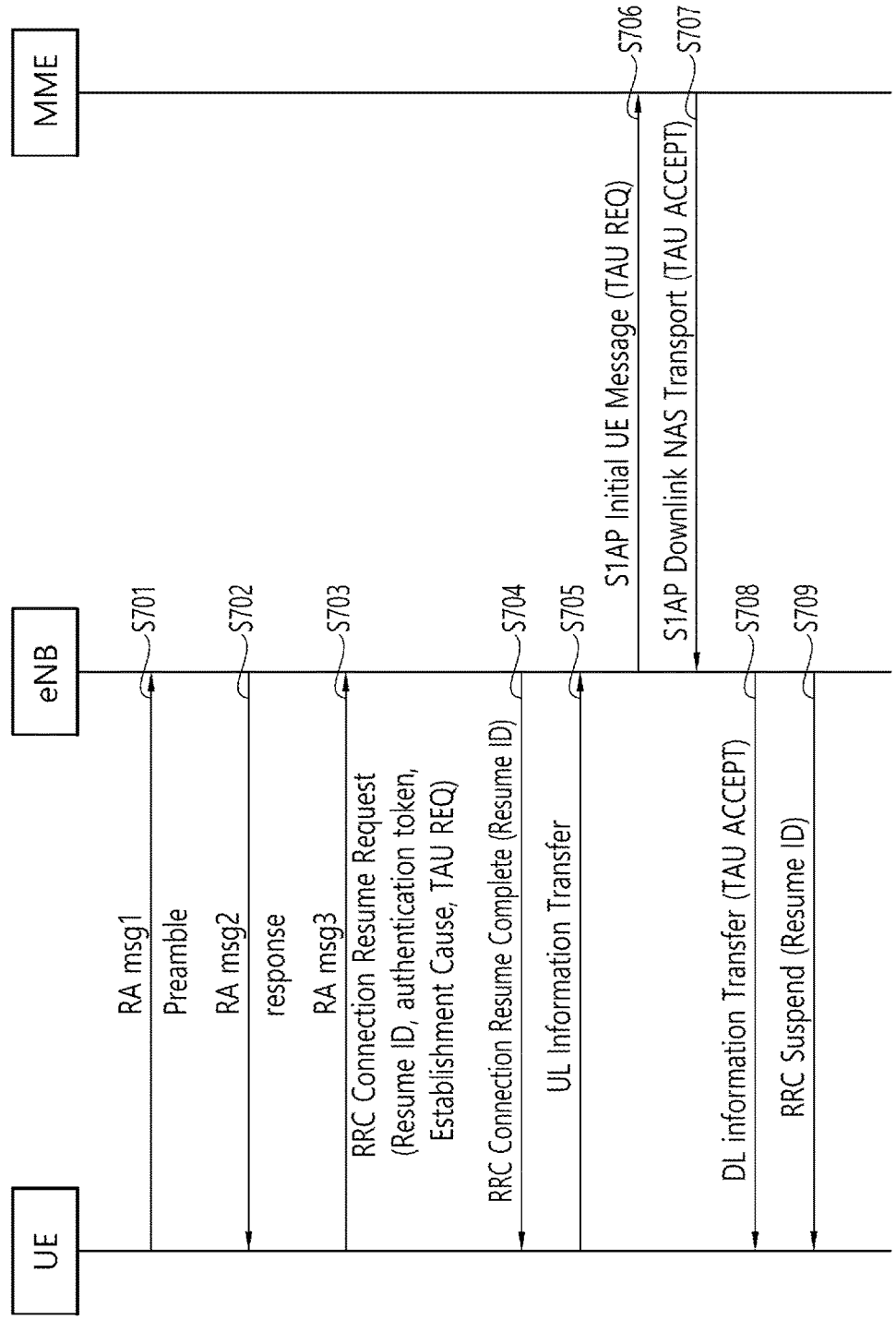
FIG. 7 shows an MM procedure for a TAU in the user plane based CIoT.

FIG. 7 shows an MM procedure for a TAU in the user plane based CIoT.

Referring to FIG. 7, in step S701 to S702, a UE complies with a legacy procedure, and a detailed description thereof is omitted.

In step S703, the UE may transmit msg3 to the eNB. The msg3 may be a new RRC Connection Resume Request message. The new RRC Connection Resume Request message may include the Resume ID, authentication token, Establishment Cause and NAS PDU of the UE. The eNB may use the Resume ID in order to associate the UE that has transmitted the Resume ID with previously stored UE context. Additionally, the msg3 may include an NAS PDU including a TAU REQUEST. In contrast, the msg3 may not include a bearer indicator (Bearer Ind) unlike an RRC Connection Resume Request message. The shortage of the bearer indicator may indicate that only an SRB is necessary for the eNB. If a space that may include the TAU REQUEST is not sufficient, a flag may indicate a subsequent message including the TAU REQUEST in step S705.

In step S704, the eNB may transmit an RRC Connection Resume Complete message to the UE. The network may complete a contention resolution. The RRC Connection Resume Complete message may include a Resume ID.

In step S705 may be performed if the msg3 does not have a sufficient space that will include the TAU REQUEST.

In step S706, the eNB may deliver the TAU REQUEST to an MME. The TAU REQUEST may be included in an S1AP initial UE message.

In step S707, the MME may transmit TAU ACCEPT to the eNB. The TAU ACCEPT may be included in an S1AP Downlink NAS transport message.

In step S708, the eNB may transmit the TAU ACCEPT to the UE. The TAU ACCEPT may be included in a DL Information Transfer message.

In step S709, the eNB may transmit an RRC Suspend message to the UE. Accordingly, the RRC connection may be suspended. The RRC Suspend message may include the Resume ID.

As described in step S703, in the case of the current user plane based CIoT, a UE transmits an RRC Connection Resume Request message not including "Bearer Ind." In general, since the UE does not transmit UL data during a TAU, this indicates that the resumption of bearer context is not necessary when an eNB transmits a TAU REQUEST to an MME. When the eNB receives the RRC Connection Resume Request message, the eNB does not transmit a UE Context Activate message, but may transmit an initial UE message including a TAU REQUEST.

If UL data is present when a UE of the ECM_IDLE state triggers a TAU procedure, the UE may transmit an RRC Connection Resume Request message, including a TAU REQUEST, along with an active flag. In this case, since the RRC Connection Resume Request message does not include "Bearer Ind", bearer context is not activated. Accordingly, in order for the UE to transmit the UL data, the UE has to perform an RRC Resume procedure after an MM procedure is completed and the UE makes transition to the RRC_IDLE state. Accordingly, for RRC suspension and RRC resumption, unnecessary signaling may occur in the Uu interface and a UE's unnecessary transition to the RRC state may occur.

Although a TAU REQUEST not having an active flag is considered in the MM procedure, there may be a problem in that an RRC Resume procedure must be performed. In the CIoT, a UE may deactivate the Access Stratum (AS) functions of the UE and enter a power saving mode (PSM).

When an MME receives a TAU request message not having an active flag, although the MME identifies that DL data to be transmitted to the UE is present, the MME cannot transmit the DL data to the UE. The reason for this is that bearer context for DL data transmission is not activated in accordance with the MM procedure.

Further, in a case of a current user plane based CIoT, the UE may attempt resumption of a suspended RRC connection by transmitting a RRC Connection Resume request to the base station. However, according to the related art, although the eNB receives a suspended RRC Connection Resume request from the UE, if the MME determines that resumption of a suspended UE context is impossible, the eNB should release the suspended RRC connection. That is, even if the eNB needs to maintain the suspended RRC connection, if the MME cannot resume the UE context, the eNB should release the suspended RRC connection.

Accordingly, in order to solve the problem, a method of configuring a bearer for the transport of user data in the user plane based cellular Internet of Things (CIoT) and an apparatus supporting the same according to embodiments of the present invention are described.

Figure 8:
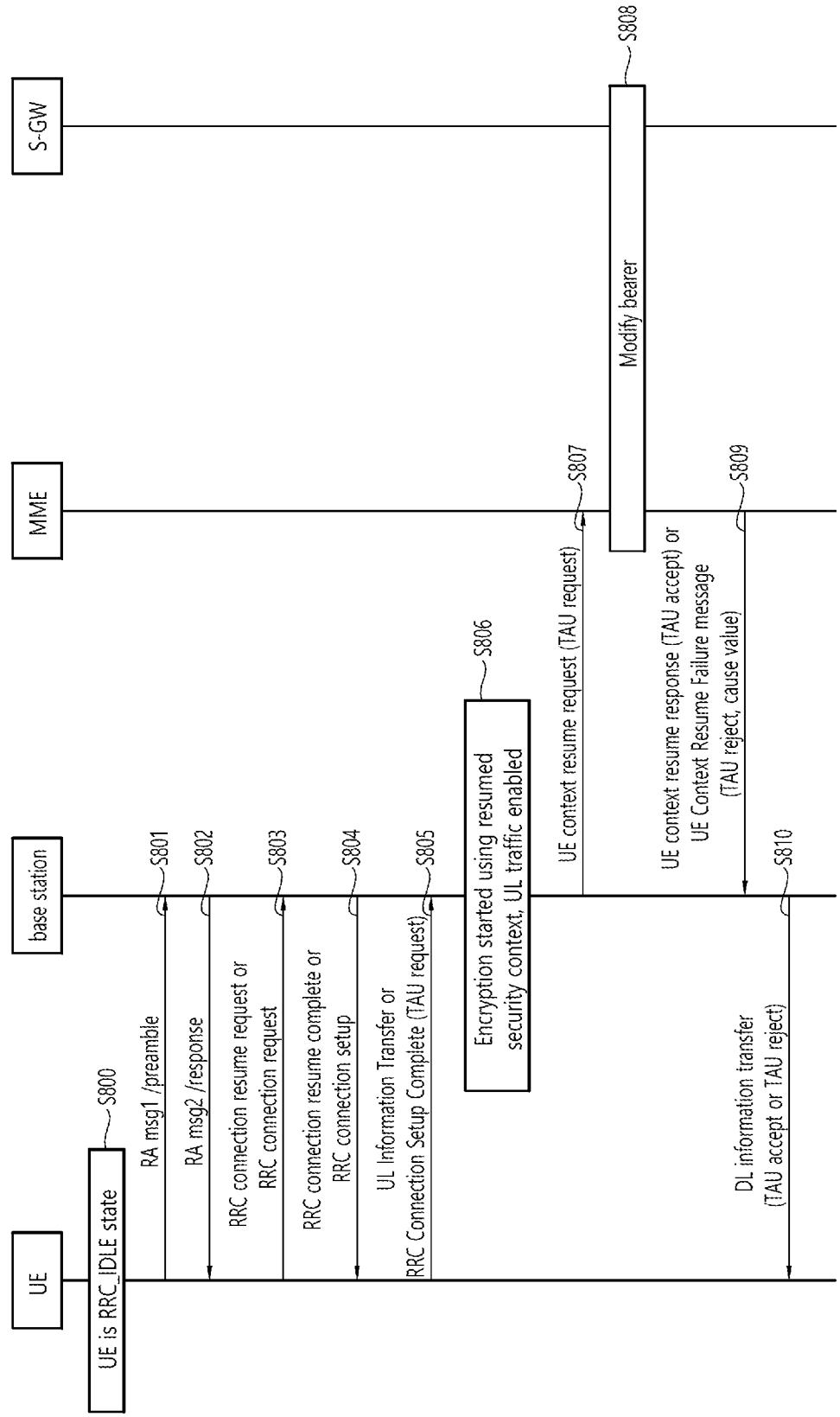
FIG. 8 shows an RRC Resume procedure when a TAU request is triggered according to an embodiment of the present invention.

FIG. 8 shows an RRC Resume procedure when a TAU request is triggered according to an embodiment of the present invention.

If the eNB knows that an RRC connection establishment triggered by the UE starts according to mo-signaling, the eNB may transmit a TAU request message to the MME using a UE Context Resume Request message. Next, the MME may provide a TAU accept message to the eNB using a UE Context Resume Response message. Alternatively, the MME may provide a TAU rejection message to the eNB using a UE Context Resume Failure message. In the specification, the UE Context Resume Request message may be used as a concept similar to an UE Context Active message. In the specification, the UE Context Resume Response message may be used as a concept similar to an UE Context Active Acknowledge message. In the specification, the UE Context Resume Failure message may be used as a concept similar to a UE Context Active Failure message.

Referring to FIG. 8, in step S800, the UE may be the RRC_IDLE state.

In step S801, the UE may transmit a random access preamble to the eNB.

In step S802, the eNB may transmit a response to the random access preamble to the UE. The response to the random access preamble may be a random access response.

In step S803, a UE may transmit a RRC connection resume request message including an Establishment Cause with mo-signaling to the eNB. Alternatively, UE may transmit a RRC connection request message including an Establishment Cause with mo-signaling to the eNB. For resumption, if the RRC connection request message is used, the RRC connection request message may include an indication requesting resumption with respect to the UE. The indication requesting resumption may be a resume request indication.

In step S804, when the eNB receives a message from a UE, the eNB may determine whether resumption is possible. If the resumption is possible and an Establishment Cause is expressed with mo-signaling, until an NAS message or an RRC connection setup complete message included in the UL Information Transfer message is received from the UE, the eNB should reserve transmission of the UL context resume request message. The eNB may transmit an RRC connection resume complete message or an RRC connection setup message to the UE in order to indicate whether resumption is possible.

In step S805, if the resumption is possible, the UE may transmit a TAU request message to the eNB. In addition, the UE may transmit an NAS message to the eNB. For example, the NAS message may be a Service Request message or an Extended Service Request message. The TAU request message or the NAS message may be included in a UL Information Transfer message or an RRC Connection Setup Complete message.

In step S806, the UE and the eNB may resume a stored security context.

In step S807, the eNB may transfer the TAU request message to an MME based on step S805. The TAU request message may be included in a UE context resume request message to be transferred to the MME. If the eNB receives a certain NAS message in step S805, the eNB may transfer the received NAS message to the MME. The received NAS message may be included in a UE context resume request message to be transferred to the MME.

In step S808, the MME may modify an S-GW and a bearer.

In step S809, the MME may transmit a UE Context Resume Response message to the eNB as a response with respect to the UE context resume request message. The UE context resume response message may include a TAU accept message. If the MME determines that resumption of a suspended UE context is possible, the UE context resume response message may be transmitted to the eNB.

Alternatively, in step S809, the MME may transmit a UE context resume failure message to the eNB as a response with respect to the UE context resume request message. The UE Context Resume Failure message may include a TAU reject message. If the MME determines that the resumption of the suspended UE context is impossible, the UE context resume failure message may be transmitted to the eNB.

If the MME receives a certain NAS message from the eNB in step S807, the MME may transmit a UE context resume response message to the eNB together with an NAS message accepting the received NAS message. Alternatively, if the MME receives a certain NAS message from the eNB in step S807, the MME may transmit a UE context resume failure message to the eNB together with an NAS message rejecting the received NAS message.

The UE context resume failure message may include a cause value indicating whether or not the eNB maintains a suspended UE context. For example, the cause value may be defined as listed in a following table 2.

TABLE 2

| | |
|---|---|
| Cause value 1 | The eNB maintains a suspended UE context. |
| Cause value 2 | The eNB does not maintain a suspended UE context. |

Alternatively, the UE context resume failure message may include a cause value indicating whether the eNB maintains a suspended UE context or the eNB provides an extended wait time to the UE. For example, the cause value may be defined as listed in a following table 3.

TABLE 3

| | |
|---|---|
| Cause value 1 | The eNB maintains a suspended UE context to provide an extended wait time to UE. |
| Cause value 2 | The eNB maintains a suspended UE context but does not provide an extended wait time to UE. |
| Cause value 3 | The eNB does not maintain a suspended UE context but provides an extended wait time to UE. |
| Cause value 4 | The eNB does not maintain a suspended UE context and does not provide an extended wait time to UE. |

The extended wait time may be a wait time taken until the UE receiving a TAU reject message retransmits an RRC connection resume request message or an RRC connection request message including a resume request indication.

In step S810, the eNB may transfer a TAU accept message or a TAU reject message to the UE. The TAU accept message or the TAU reject message may be transferred using a DL information transfer message.

If the eNB receives a certain NAS message, the eNB may transfer the received NAS message to the UE using DL information transfer message.

If the eNB receives a UE context resume failure message including a cause value, the eNB may determine whether or not to keep a suspended UE context based on the cause value. Alternatively, if the eNB receives a UE context resume failure message including the cause value, the eNB may determine whether or not to keep the suspended UE context based on the cause value or whether to provide an extended wait time to the UE.

Figure 9:
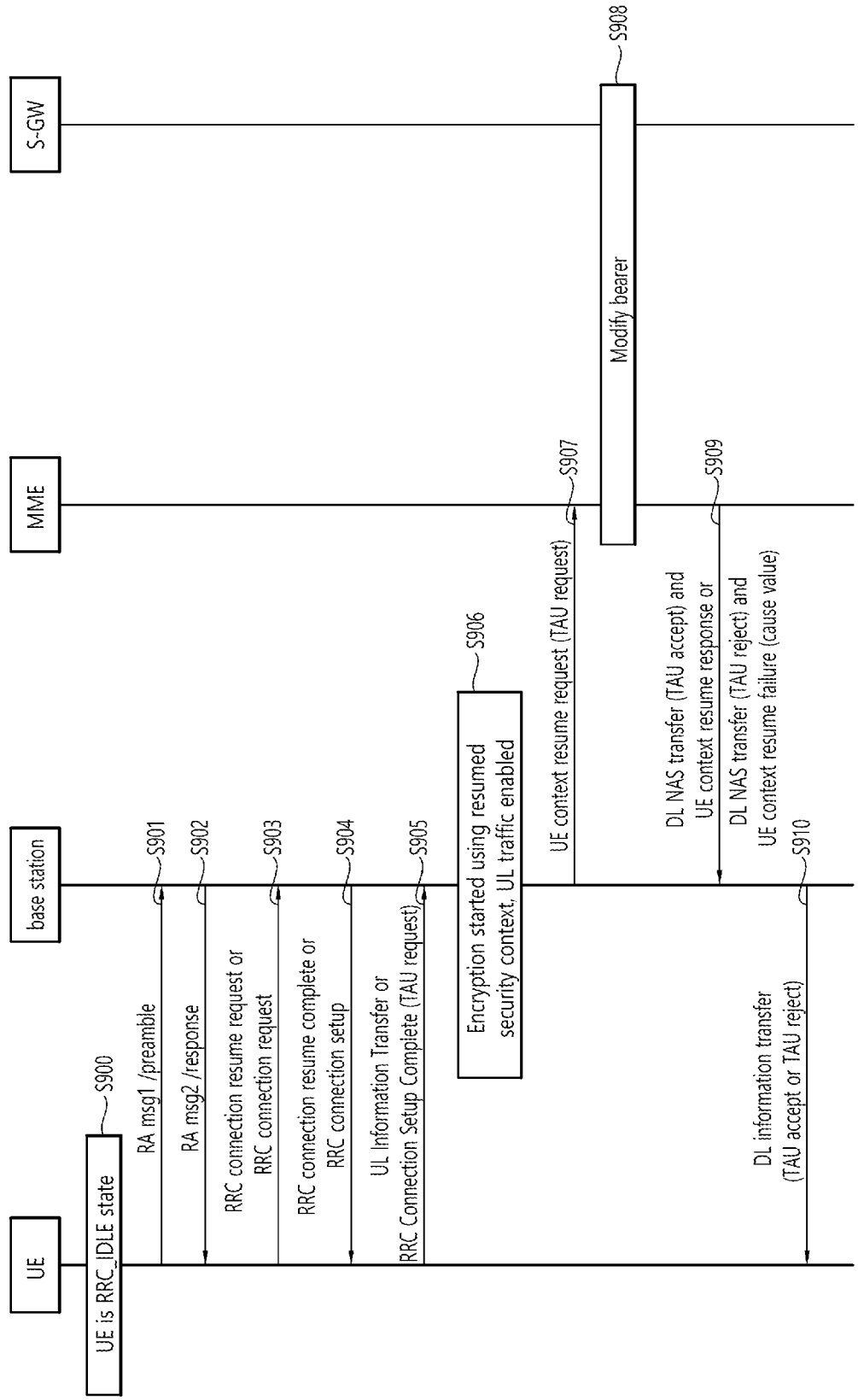
FIG. 9 shows an RRC Resume procedure when a TAU request is triggered according to an embodiment of the present invention.

FIG. 9 shows an RRC Resume procedure when a TAU request is triggered according to an embodiment of the present invention.

If the eNB knows that an RRC connection establishment triggered by the UE starts according to mo-signaling, the eNB may transmit a TAU request message to the MME using a UE Context Resume Request message. Next, the MME may provide a TAU accept message to the eNB using a UE Context Resume Response message. In addition, the MME may provide one of a UE Context Resume Response message or a UE Context Resume Failure message including the cause value to the eNB.

Referring to FIG. 9, a UE may be in an RRC_IDLE state.

In step S901, the UE may transmit a random access preamble to an eNB.

In step S902, the eNB may transmit a response with respect to the random access preamble to the UE. The response with respect to the random access preamble may be a random access response.

In step S903, a UE may transmit a RRC connection resume request message including an Establishment Cause with mo-signaling to the eNB. Alternatively, UE may transmit a RRC connection request message including an Establishment Cause with mo-signaling to the eNB. For resumption, if the RRC connection request message is used, the RRC connection request message may include an indication requesting resumption to the UE. The indication requesting resumption may be a resume request indication.

In step S904, when the eNB receives a message from a UE, the eNB may determine whether resumption is possible. If the resumption is possible and an Establishment Cause is expressed with mo-signaling, until an NAS message or an RRC connection setup complete message included in the UL Information Transfer message is received from the UE, the eNB should reserve transmission of the UL context resume request message. The eNB may transmit an RRC connection resume complete message or an RRC connection setup message to the UE in order to indicate whether resumption is possible.

In step S905, if the resumption is possible, the UE may transmit a TAU request to the eNB. In addition, the UE may transmit an NAS message to the eNB. For example, the NAS message may be a Service Request message or an Extended Service Request message. The TAU request message or the NAS message may be included in a UL Information Transfer message or an RRC Connection Setup Complete message.

In step S906, the UE and the eNB may resume a stored security context.

In step S907, the eNB may transfer the TAU request message to an MME based on step S905. The TAU request message may be included in a UE context resume request message to be transferred to the MME. If the eNB receives a certain NAS message in step S905, the eNB may transfer the received NAS message to the MME. The received NAS message may be included in a UE context resume request message to be transferred to the MME.

In step S908, the MME may modify an S-GW and a bearer.

In step S909, the MME may transmit a TAU accept message or a TAU reject message included in a DL NAS Transport message to the eNB. If the MME determines that resumption of the suspended UE context is possible, the TAU accept message may be transmitted to the eNB. If the MME determines that resumption of the suspended UE context is impossible, the TAU reject message may be transmitted to the eNB.

In addition, the MME may transmit a UE context resume response message or a UE context resume failure message to the eNB. If the MME determines that the resumption of the suspended UE context is possible, the UE context resume response message may be transmitted to the eNB. If the MME determines that the resumption of the suspended UE context is impossible, the UE context resume failure message may be transmitted to the eNB. If the MME transmits the UE context resume failure message, the UE context resume failure message may include a cause value. The cause value may be defined as listed in the table 2. Alternatively, the cause value may be defined as listed in the table 3.

In step S910, the eNB may transfer a TAU accept message or a TAU reject message to the UE. The TAU accept message or the TAU reject message may be transferred using a DL information transfer message.

If the eNB receives a certain NAS message, the eNB may transfer the received NAS message using DL information transfer message.

If the eNB receives a UE context resume failure message including a cause value, the eNB may determine whether or not to keep a suspended UE context based on the cause value. Alternatively, if the eNB receives a UE context resume failure message including the cause value, the eNB may determine whether or not to keep the suspended UE context based on the cause value or whether to provide an extended wait time to the UE.

Therefore, according to an embodiment of the present invention, even when the MME determines that the resumption of the UE context is impossible, the eNB does not release connection with the UE, but may determine whether or not to keep the suspended UE context. Moreover, since the eNB provides an extended wait time to the UE, when the MME cannot resume the suspended UE context, the eNB may prevent the UE from directly transmitting a RRC connection request message including an RRC connection resume request or a resume request indication to the eNB.

Figure 10:
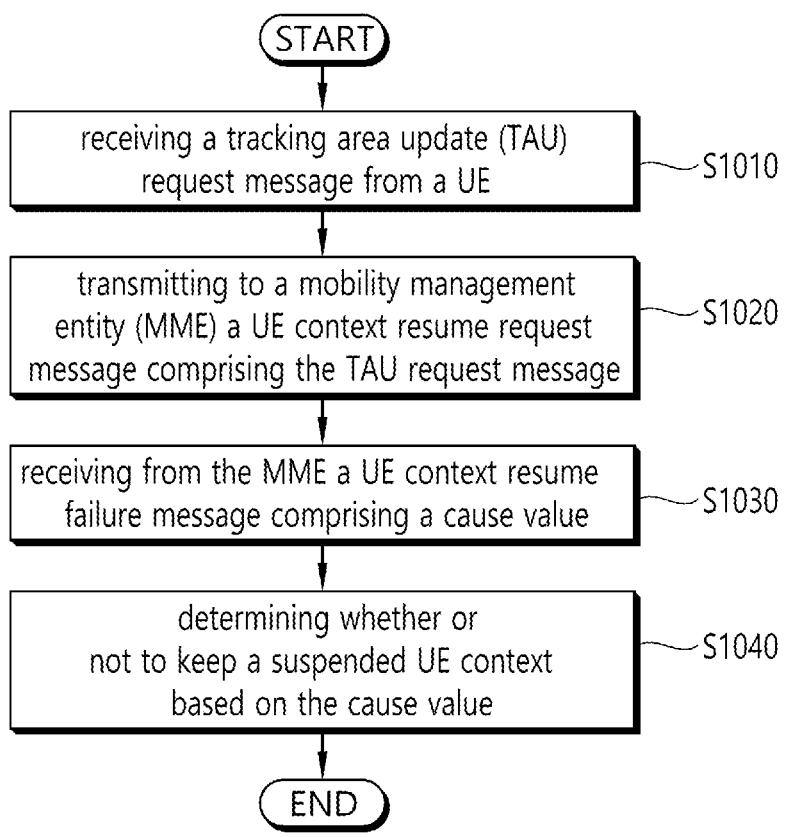
FIG. 10 is a flowchart illustrating a method for configuring a bearer for transmission of user data in a user plane based CIoT by an eNB according to the embodiment of the present invention.

FIG. 10 is a flowchart illustrating a method for configuring a bearer for transmission of user data in a user plane based CIoT by an eNB according to the embodiment of the present invention.

Referring to FIG. 10, in step S1010, an eNB may receive a tracking area update (TAU) request message from a UE. The UE may be in an RRC_IDLE state.

In step S1020, the eNB may transmit, to a mobility management entity (MME), a UE context resume request message including the TAU request message.

In step S1030, the eNB may receive, from the MME, a UE context resume failure message including a cause value.

The cause value may include information indicating whether the eNB maintains the suspended UE context. Alternatively, the cause value may include information indicating whether the eNB maintains the suspended UE context and whether the eNB provides the extended wait time to the UE.

If it is determined by the MME that the resumption of the suspended UE context is impossible, the UE context resume failure message may be received from the MME.

The UL context resume failure message may further include a TAU reject message. Alternatively, the eNB may receive a downlink NAS transport message including a TAU reject message from the MME.

In step S1040, the eNB may determine whether or not to keep a suspended UE context based on the cause value. In addition, the eNB may determine whether to provide an extended wait time to the UE based on the cause value.

If the cause value indicates that the eNB maintains the suspended UE context, it may be determined that the suspended UE context is kept. If the cause value indicates that the eNB does not maintain the suspended UE context, it may be determined that the suspended UE context is not kept.

Figure 11:
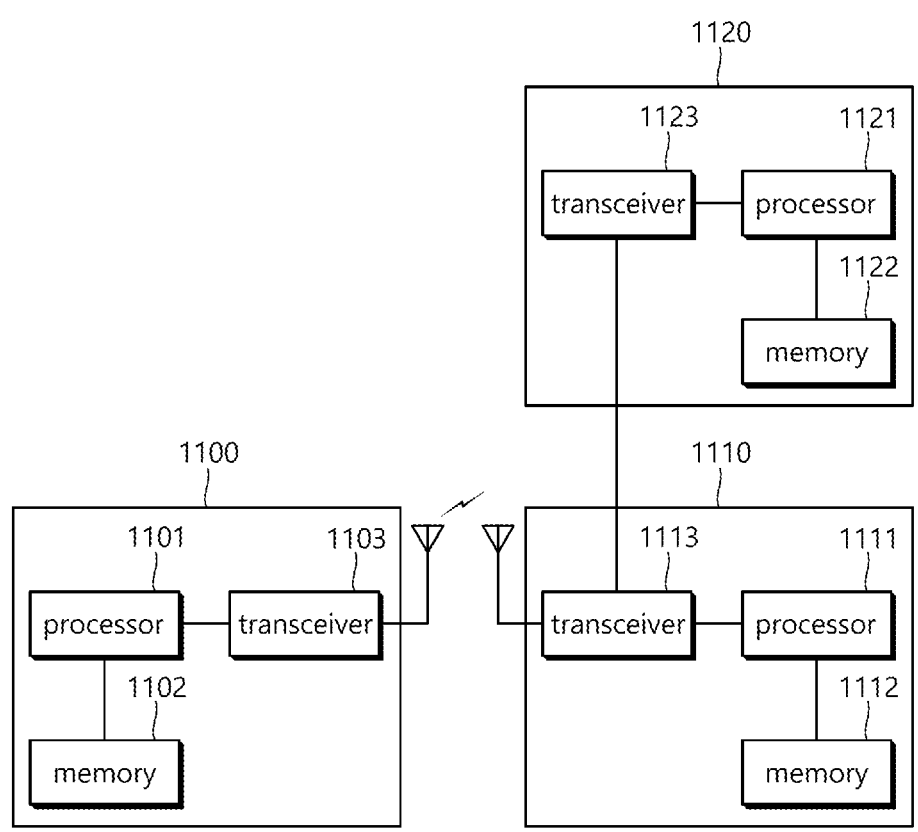
FIG. 11 is a block diagram illustrating a wireless communication system according to the embodiment of the present invention.

FIG. 11 is a block diagram illustrating a wireless communication system according to the embodiment of the present invention.

A UE 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the UE may be implemented by the processor 1101.

A BS 1110 includes a processor 1111, a memory 1112 and a transceiver 1113. The memory 1112 is connected to the processor 1111, and stores various types of information for driving the processor 1111. The transceiver 1113 is connected to the processor 1111, and transmits and/or receives radio signals. The processor 1111 implements proposed functions, processes and/or methods. In the above embodiment, an operation of the BS may be implemented by the processor 1111.

A MME 1120 includes a processor 1121, a memory 1122 and a transceiver 1123. The memory 1122 is connected to the processor 1121, and stores various types of information for driving the processor 1121. The transceiver 1123 is connected to the processor 1121, and transmits and/or receives radio signals. The processor 1121 implements proposed functions, processes and/or methods. In the above embodiment, an operation of the MME may be implemented by the processor 1121.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for configuring a bearer for transmission of user data in user plane based cellular Internet of Things (CIoT) by a base station in a wireless communication system, the method comprising:
   receiving a tracking area update (TAU) request message from a user equipment (UE);
   transmitting to a mobility management entity (MME) a UE context resume request message comprising the TAU request message;
   receiving from the MME a UE context resume failure message comprising a cause value,
   wherein the cause value comprises information informing the base station to keep the suspended UE context and to transmit information informing the UE of an extended wait time;
   keeping a suspended UE context based on the cause value; and
   transmitting information to the UE informing the UE of an extended wait time based on the cause value.

2. The method of claim 1, wherein the UE context resume failure message further comprises a TAU reject message.

3. The method of claim 1, further comprising:
   receiving a downlink NAS transport message including a TAU reject message from the MME.

4. The method of claim 1, wherein based on a determination by the MME that resumption of the suspended UE context is impossible, the UE context resume failure message is received from the MME.

5. The method of claim 1, wherein the UE is in an RRC_IDLE state.

6. A base station for configuring a bearer for transmission of user data in user plane based cellular Internet of Things (CIoT) in a wireless communication system, the base station comprising:
   a memory; a transceiver; and
   a processor, connected with the memory and the transceiver, that:
   controls the transceiver to receive a tracking area update (TAU) request message from a user equipment (UE),
   controls the transceiver to transmit a UE context resume request message comprising the TAU request message to a mobility management entity (MME),
   controls the transceiver to receive a UE context resume failure message comprising a cause value from the MME,
   wherein the cause value comprises information informing the base station to keep the suspended UE context and to transmit information informing the UE of an extended wait time,
   keeps a suspended UE context based on the cause value, and
   transmits information to the UE informing the UE of an extended wait time based on the cause value.

7. The base station of claim 6, wherein based on a determination by the MME that resumption of the suspended UE context is impossible, the UE context resume failure message is received from the MME.

* * * * *